US005557749A

United States Patent [19]
Norris

[11] Patent Number: 5,557,749
[45] Date of Patent: Sep. 17, 1996

[54] SYSTEM FOR AUTOMATICALLY COMPRESSING AND DECOMPRESSING DATA FOR SENDER AND RECEIVER PROCESSES UPON DETERMINATION OF A COMMON COMPRESSION/DECOMPRESSION METHOD UNDERSTOOD BY BOTH SENDER AND RECEIVER PROCESSES

[75] Inventor: David Norris, Portland, Oreg.

[73] Assignee: Intel Corporation, Santa Clara, Calif.

[21] Appl. No.: 961,475

[22] Filed: Oct. 15, 1992

[51] Int. Cl.$^6$ .......................... G06F 13/00; G06F 13/14; G06F 13/36
[52] U.S. Cl. .................. 395/200.18; 395/500; 395/872; 395/888; 364/259.2; 364/260; 364/284.4
[58] Field of Search ...................................... 395/500, 200, 395/200.08, 872, 200.18, 888

[56] References Cited

U.S. PATENT DOCUMENTS

| | | | |
|---|---|---|---|
| 4,386,416 | 5/1983 | Giltner et al. | 364/900 |
| 4,454,575 | 6/1984 | Bushaw et al. | 364/200 |
| 4,509,167 | 4/1985 | Bantel et al. | 370/62 |
| 4,879,742 | 11/1989 | Taniguchi et al. | 379/111 |
| 5,021,943 | 6/1991 | Grimes | 364/200 |
| 5,051,720 | 9/1991 | Kittirutsunetorn | 340/310 |
| 5,077,732 | 12/1991 | Fischer et al. | 370/85.4 |
| 5,210,851 | 5/1993 | Kato et al. | 395/425 |
| 5,231,494 | 7/1993 | Wachob | 358/146 |
| 5,325,297 | 6/1994 | Bird et al. | 364/419.07 |
| 5,481,701 | 1/1996 | Chambers, IV | 395/600 |

*Primary Examiner*—Thomas C. Lee
*Assistant Examiner*—Rehana P. Krick
*Attorney, Agent, or Firm*—Blakely, Sokoloff, Taylor & Zafman

[57] ABSTRACT

A number of data compression and decompression server processes and a socket interface to which these server processes can be attached are provided to each computer system of a network. Additionally, an OPEN, a WRITE, and a READ routine are provided to the operating system of each computer system of the network. The OPEN routine is used by a client sender process to establish connection to a client receiver process computer system. In the course of establishing the connection, the OPEN routine automatically negotiate a compression/decompression method between the sender and the receiver computer system. The WRITE routine is used by the client sender process to send data to the client process. In the course of sending the data, the WRITE routine automatically invokes the appropriate compression method to compress the data based on the result of the negotiation performed by the OPEN routine. The READ routine is used by the client receiver process to receive data from the sender process. Similarly, in the course of receiving the data, the READ routine automatically invokes the appropriate decompression method to decompress the data based also on the result of the negotiation performed by the OPEN routine. As a result, the automatic data compression and decompression are completely transparent to the client sender and receiver processes.

4 Claims, 4 Drawing Sheets

SYSTEM FOR AUTOMATICALLY COMPRESSING AND DECOMPRESSING DATA FOR SENDER AND RECEIVER PROCESSES UPON DETERMINATION OF A COMMON COMPRESSION/DECOMPRESSION METHOD UNDERSTOOD BY BOTH SENDER AND RECEIVER PROCESSES

BACKGROUND OF THE INVENTION

1. Field of the Invention

The present invention relates to the field of computer systems, in particular, microprocessor based computer systems connected as a network. More specifically, the present invention relates to data transfers between these computer systems.

2. Background

As cost performance of computer systems continues to improve, and more and more computer systems are connected together via local and wide area networks, data communication between computer systems has become an essential part of computing. Various well known data communication, networking and internetworking techniques have been developed to transfer data efficiently between computer systems in a network and across networks. However, faced with ever increasing volume of data to be transferred between systems, it has become increasingly necessary to push the performance limits of existing technologies to their absolute maximums, particularly in local area networks comprising microprocessor based computer systems. One approach is to logically increase the bandwidth of a network by transmitting compressed data, and decompresses them after reception. Various well known data compression and decompression techniques, such as Huffman and Liembel-Ziv W., have been developed.

Typically it is the responsibility of the sender application to compress the data before transmission, and the responsibility of the receiver application to decompress the data after reception. While the sender and receiver applications typically invoke specialized routines or servers to perform the actual compression and decompression of the data, nevertheless, the sender and receiver applications are placed with the burden of having to coordinate among themselves on which compression and decompression technique to use. The burden quickly become unmanageable for the applications on even a moderate size network with a moderate number of computer systems, each running a moderate number of applications. As a result, the use of data compression and decompression to increase data communication performance remains limited.

Thus, it is desirable if data can be automatically transferred among computer systems in a network or across networks in a compressed manner that is transparent to the applications. As will be disclosed, the present invention provides a method and apparatus for transferring data among computer systems in a network that achieves the above described desired results.

SUMMARY OF THE INVENTION

A method and apparatus for automatically transferring data between computer systems in a network or across networks in a compressed manner is disclosed. Under the present invention, data compression and decompression are transparent to the sender and receiver applications, thereby relieving the sender applications the burden of having to know the compression techniques understood by the receiver applications. The present invention has particular application to microprocessor based computer systems connected in a local area network such as Ethernet.

Under the present invention, a number of data compression and decompression server processes and a socket interface to which these server processes can be attached are provided to each computer system of a network. Additionally, an OPEN, a WRITE, and a READ routine are provided to the operating system of each computer system of the network. The OPEN routine is used by a client sender process to establish connection to a client receiver process computer system. In the course of establishing the connection, the OPEN routine automatically negotiate a compression method between the sender and the receiver computer system. The WRITE routine is used by the client sender process to send data to the client process. In the course of sending the data, the WRITE routine automatically invokes the appropriate compression method to compress the data based on the result of the negotiation performed by the OPEN routine. The READ routine is used by the client receiver process to receive data from the sender process. Similarly, in the course of receiving the data, the READ routine automatically invokes the appropriate decompression method to decompress the data based also on the result of the negotiation performed by the OPEN routine. As a result, the automatic data compression and decompression are completely transparent to the client sender and receiver processes.

In the presently preferred embodiment, the compression method is negotiated via messages exchanged between the sender and the receiver computer system, using a sender dominance priority resolution algorithm for resolving priority or preference conflicts. Additionally, the negotiated compression/decompression method is logged in the corresponding routing tables of the sender and receiver computer system.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION PRESENTLY PREFERRED AND ALTERNATE EMBODIMENTS

A method and apparatus for automatically transferring data between computer systems in a network or across networks in a compressed manner is disclosed. Under the present invention, data compression and decompression are transparent to the sender and receiver applications, thereby relieving the sender applications the burden of having to know the compression techniques understood by the receiver applications. The present invention has particular application to microprocessor based computer systems connected in a local area network such as Ethernet. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
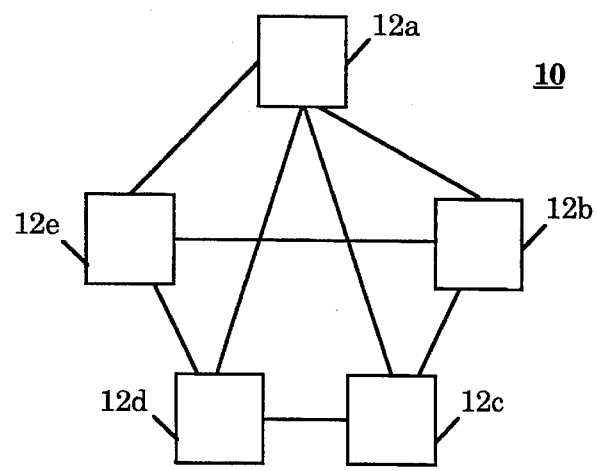
FIG. 1 illustrates an exemplary computer network incorporated with the teachings of the present invention.

Referring now to FIG. 1, a block diagram illustrating a computer network incorporated with the teachings of the present invention is shown. Shown is a computer network 10 comprising a number of nodes, 12a–12e. Each node, 12a . . . or 12e, represents a computer system or a sub-network incorporated with the teachings of the present invention. While the computer network 10 illustrated in FIG. 1 has a star-like topology, based on the descriptions to follow, it will be appreciated that the present invention may be practiced with networks and subnetworks of other well known topologies. Additionally, the present invention may be practiced with only a subset of the computer systems in a network or subnetwork having incorporated the teachings of the present invention. These computer systems having incorporated the teachings of the present invention will communicate with each other in compressed data. Communication between computer systems with and without the present invention and among computer systems without the present invention will be in uncompressed data.

Figure 2:
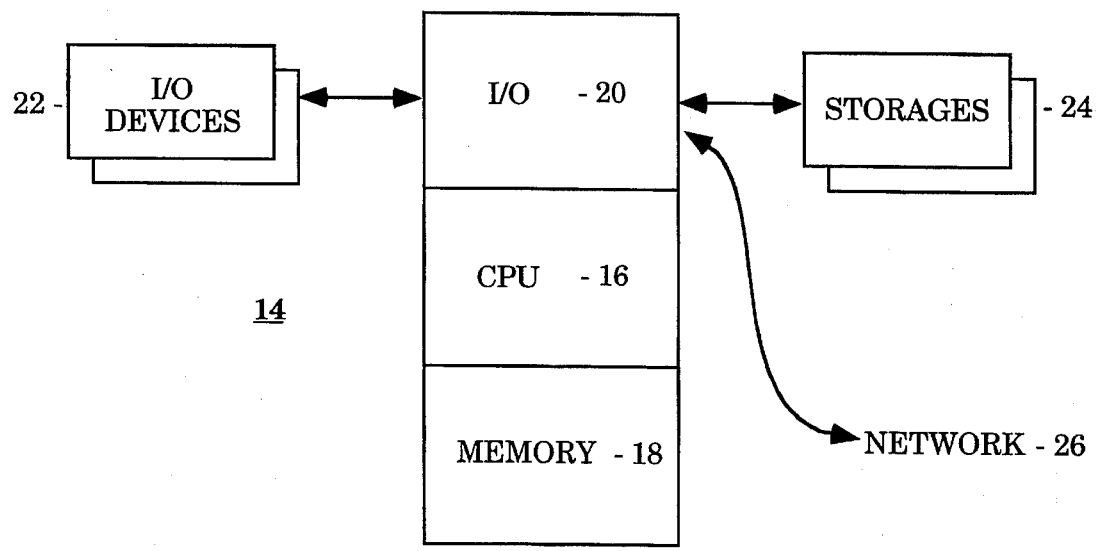
FIG. 2 illustrates the hardware elements of an exemplary computer system in the exemplary computer network of FIG. 1.
Figure 3:
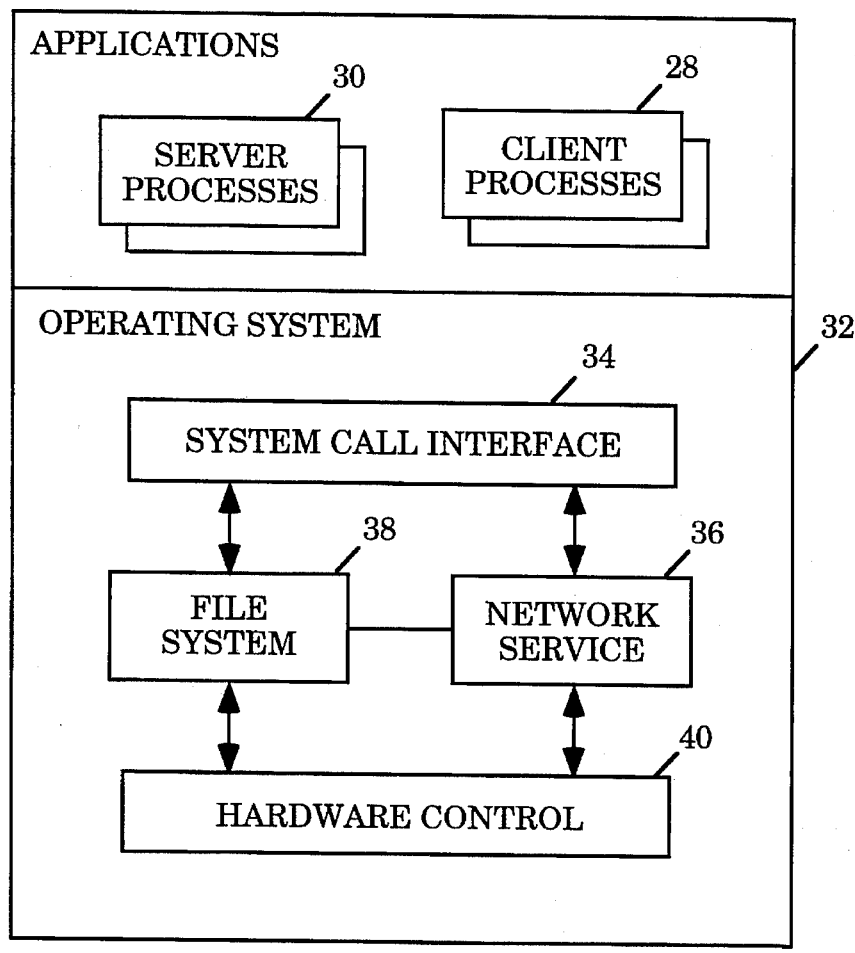
FIG. 3 illustrates the software elements of the exemplary computer system of FIG. 2.
Figure 4:
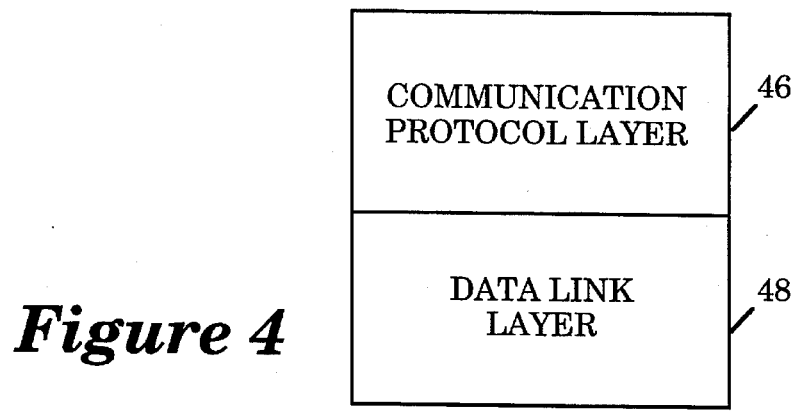
FIG. 4 illustrates a logical view of the networking services of the exemplary computer system of FIG. 2.

Referring now to FIGS. 2–4, three block diagrams illustrating the hardware and software elements, and network series of an exemplary computer system in the computer network of FIG. 1 incorporated with the teachings of the present invention is shown. FIG. 2 illustrates the hardware elements of such exemplary computer system 14. The computer system 14 comprises a central processing unit (CPU) 16, a memory 18, and an I/O module 20. Additionally, the exemplary computer system 14 also comprises a number of input/output devices 22, and a number of storage devices 24. The CPU 16 is coupled to the memory 18 and the I/O module 20. The input/output devices 22, and the storage devices 24 are also coupled to the I/O module 20. The I/O module 20 in turn is coupled to a network 26.

Except for the manner they are used to practice the present invention, the CPU 16, the memory 18, the I/O module 20, the input/output devices 22, the storage devices 24, and the network 26, are intended to represent a broad category of these hardware elements found in most computer systems. The constitutions and basic functions of these elements are well known and will not be otherwise further described here.

FIG. 3 illustrates the software elements of the exemplary computer system of FIG. 2. Shown are client and server application processes, 28 and 30, executing on the computer system using system services provided by the operating system 32. In particular, the server processes 30 comprise a number of data compression and decompression server processes, such as server processes for the well known Huffman and Liembel-Ziv W. data compression and decompression techniques. Otherwise, the client and server application processes, 28 and 30, are intended to represent a broad category of these processes found in most computer systems. Their constitutions and basic functions are well known and will not be otherwise further described here.

Also shown is an operating system 32 comprising a system call interface 34 for its services, a number of file system service routines 38, a number of network service routines 36, and a number of hardware control routines 40. In particular, the system call interface 34 comprises a socket like interface to which the above described data compression and decompression server processes can be attached. Furthermore, the file system service routines 38 comprises an OPEN, a READ, a WRITE and a CLOSE routine incorporated with the teachings of the present invention. The network service routines 36 comprise various routines for handling various communication protocols such as the Transmission Control Protocol (TCP), including a message routing table for tracking the communication path to a particular node in the network. The services provided by the network service routines 36 include adding header/trailer information to the data being transmitted to facilitate their routing, and guaranteeing that the data being transmitted will not be corrupted. The hardware control routines 40 comprise various routines for handling physical layer interaction. Except for the teachings of the present invention incorporated in the OPEN, READ, WRITE and CLOSE routines, and the manner the other routines cooperate with them, the operating system 32 including the various routines 34–40, regardless whether they are particularized above, are intended to represent a broad category of these elements found in most computer systems. Their constitutions and basic functions are well known, and will not be otherwise described in further detail here.

FIG. 4 illustrates a logical view of the network services described above. Shown are two layers of network services: the communication protocol layer 46, and the data link service layer 48. The communication protocol layer 46 comprises the various network related process control routines, and the data link service layer 48 comprises the various network related hardware control service routines. Similarly, except for the manners these various network service layers are used to practice the present invention, they are intended to represent a broad categories of network services found in various equivalent network service models. Their constitutions and basic functions are well known, and will not be otherwise described further here.

Figure 5:
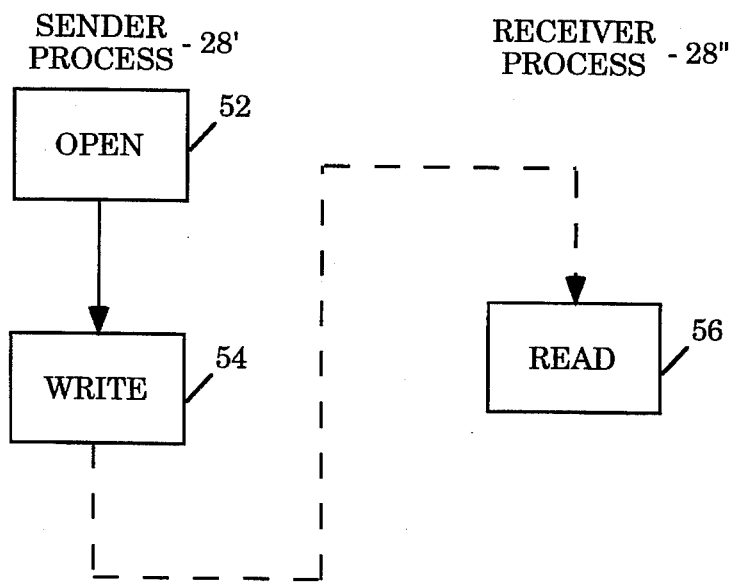
FIG. 5 illustrates data communication between a sender and a receiver process executing on two different computer systems illustrated in FIG. 1 under the present invention.

Referring now to FIG. 5, a block diagram illustrating the data transmission and reception process between the sender and receiver application processes under the present invention is shown. As illustrated, the sender application process 28' uses the OPEN call 52 to establish connection to the computer system on which the receiver application process 28" is running. The sender application process 28' identifies the receiver process' computer system to the OPEN routine 52. Upon establishing connection, the sender application process 28' uses the WRITE call 54 to transmit the data to the receiver process. The receiver application process 28" uses the READ call 56 to receive the data transmitted from the sender application process 28'. The OPEN, WRITE, and READ routines 52–56, and the above described network service related elements cooperate to automatically compress the data before their transmission and decompress them upon reception. The entire data compression and decompression process is transparent to the sender and receiver application processes 28' and 28".

Figure 7:
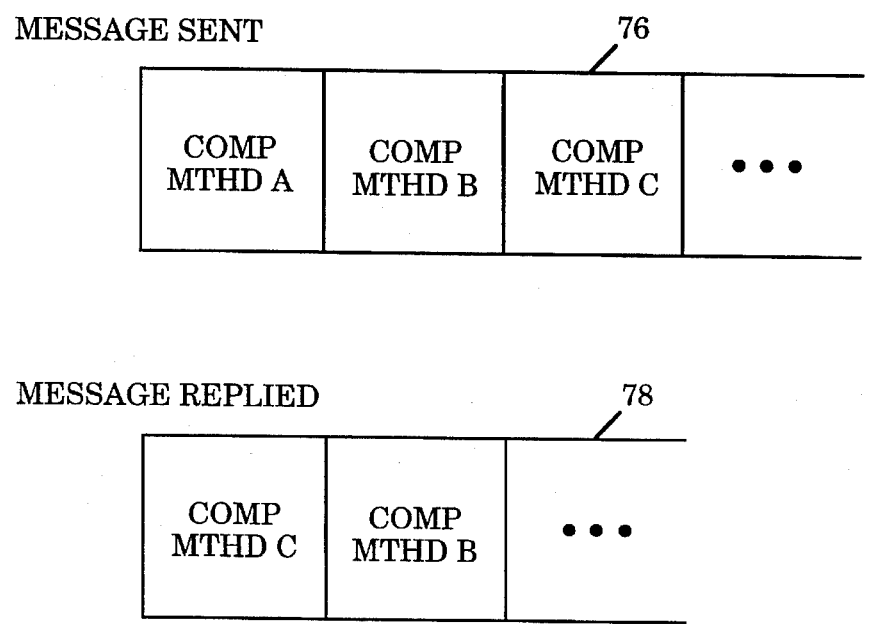
FIG. 7 illustrates one embodiment of the compression/decompression method negotiation messages exchanged between the sender and receiver computer systems under the present invention.
Figure 6:
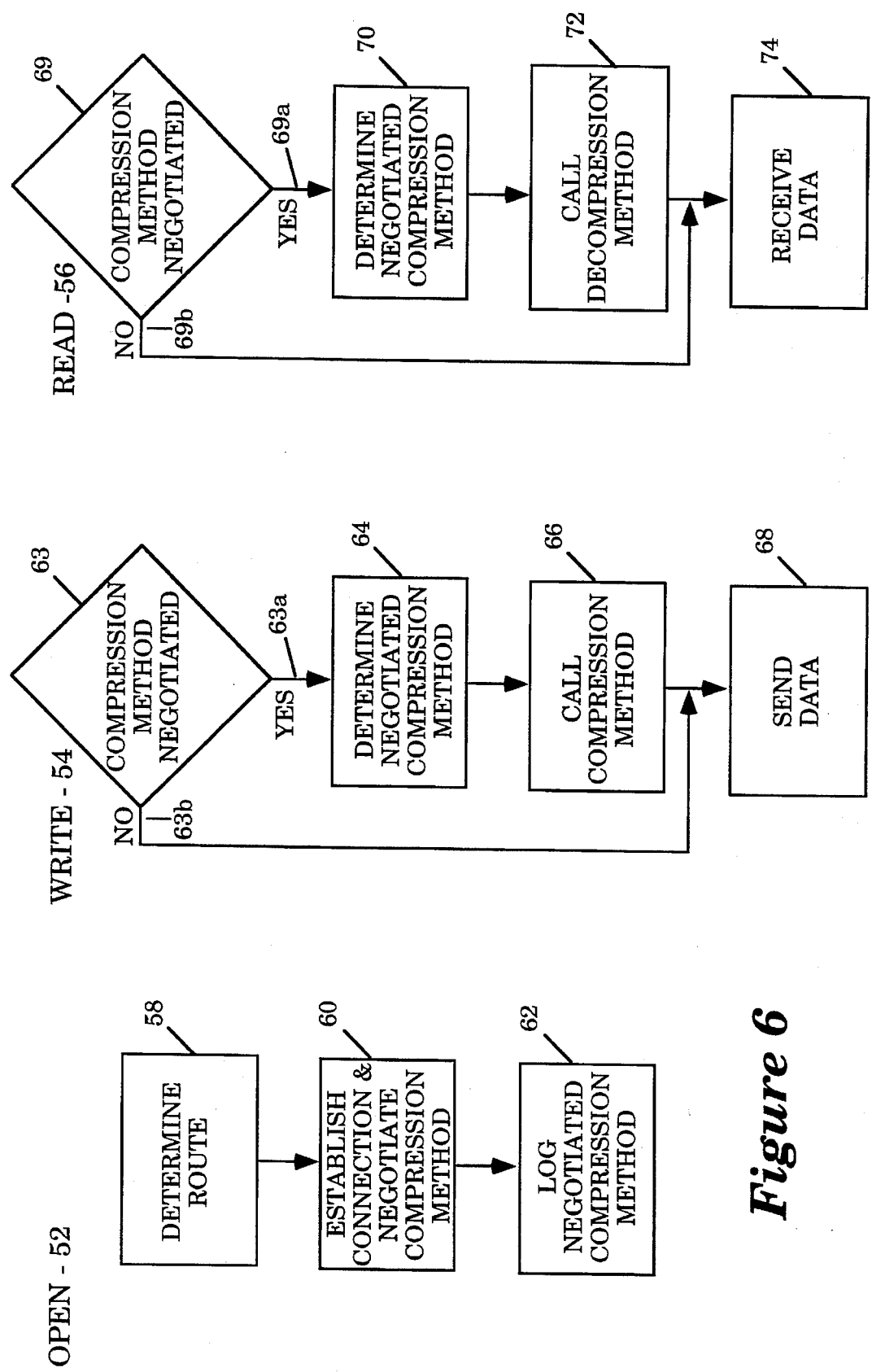
FIG. 6 illustrates the operation flows of the Open, Write, and Read services of the operating system illustrated in FIG. 2 under the present invention.

Referring now to FIGS. 6–7, two block diagrams illustrating the operation flows of the OPEN, READ, and WRITE routines, and the connection establishing messages exchanged between the sender and receiver computer systems under the present invention are shown. As illustrated in FIG. 6, upon invocation, the OPEN routine 52 determines the communication route to the receiver process' computer system using the above described routing table, block 58. Upon determining the communication route, the OPEN routine 52 attempts to establish connection to the receiver process' computer system, block 60. Simultaneously, the OPEN routine 52 negotiates a compression method with the receiver process' computer system. The OPEN routine 52 initiates the negotiation by sending a message to the compression socket interface of the receiver process' computer system through the network services of both computer systems. As illustrated in FIG. 7, the message 76 comprises a list of data compression techniques available on the sender process' computer system, preferably in order of priority, i.e. preference. In response, the receiver process' computer system replies with a message 78 through the network services of both computer systems. The message 78 comprises the data compression techniques understood by the receiver process' computer system, preferably also in order of priority, i.e. preference. The negotiated compression method is inferred from the message exchange based on a predetermined priority or preference resolution algorithm. Upon negotiating the compression method, the negotiated compression method is logged in the routing tables of both computer systems, block 62.

In the presently preferred embodiment, if the receiver process' computer system supports compression software but does not choose to allow exchange of compressed data at this time, the receiver process' computer system replies with a message comprising a null list of compression methods. Additionally, if the receiver process' computer system does not reply within a predetermined period, the OPEN routine 52 assumes that the receiver process' computer system does not support exchange of compressed data. The OPEN routine 52 opens a normal connection through the network services of both computer systems and records in the routing table that no compression method negotiated.

In the presently preferred embodiment, the difference in priority or preference is resolved by sender dominance. In other words, the "negotiated" compression method is the compression method with the highest sender priority understood by the receiver. Thus, for the exemplary message exchange illustrated in FIG. 7, compression method B is the negotiated compression method. Additionally, the negotiated compression method is logged in the routing table of both computer systems.

As illustrated in FIG. 6, upon invocation, the WRITE routine 54 determines from the routing table if a compression method was successfully negotiated, block 63. If a compression method was successfully negotiated, branch 63a, the WRITE routine 54 determines from the routing table the negotiated compression method, block 64, and calls the appropriate data compression server process to compress the data, block 66. Upon either determining that no compression method was negotiated or returning from the data compression server, the write routine 54 sends the uncompressed/compressed data to the receiver process' computer system through the network of services of both computer systems, block 68.

Similarly, upon invocation, the READ routine 56 reads the uncompressed/compressed data through the network service of its computer system. Concurrently, the READ routine 56 determines from the routing table if a compression method was successfully negotiated, block 69. If a compression method was successfully negotiated, branch 69a, the READ routine 56 determines from the routing table the negotiated compression method, block 70, and calls the appropriate data decompression server process to decompress the data, block 72, before providing the received data to the receiver process, block 74. Otherwise, the READ routine 56 simply provides the uncompressed data to the receiver process, block 74.

While for ease of understanding, the present invention has been described with the negotiated compression/decompression method being logged in the routing tables of the computer systems, it will be appreciated that the present invention may be practiced with the negotiated method being logged in other manners. Additionally, while for ease of understanding, the present invention has been described with the negotiation being conducted with each OPEN, it will be appreciated that the present invention may be practiced with the negotiation being performed only for the first OPEN between any two computer systems.

Since, under the present invention, the compression and decompression of data are performed before providing the data to be transmitted to the sending computer system's networking service and after receiving the transmitted data from the receiving computer system's networking service, respectively, the present invention may be practiced without any modifications to the sending and receiving computer system's network services.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a network of computer systems comprising a sender computer system having a sender process and a receiver computer system having a receiver process, wherein said sender process provides data to said receiver process, a computer implemented method for transferring said data from said sender process to said receiver process, said method comprising the steps of:

a) providing a sender list of compression/decompression methods understood by said sender computer system by a first system service of said sender computer system to a second system service of said receiver computer system while establishing connection between said sender computer system to said receiver computer system on behalf of said sender process, said sender list being provided in order of sender preference;

providing a receiver list of compression/decompression methods understood by said receiver computer system by said second system service to said first system service in response to said provided sender list while establishing connection between said receiver computer system and said sender computer system, said receiver list being provided in order of receiver preference;

deducing individually a compression/decompression method understood by both said sender and receiver computer systems in accordance to an identical predetermined manner using said sender and receiver lists provided by said first as well as said second system service, based on sender preference dominance, without further communication between said first and said second system services for the purpose of deducing said compression/decompression method understood by both;

b) logging said determined compression/decompression method on said sender and receiver computer systems by said first and second system services respectively;

c) compressing automatically said data to be transferred in accordance to said logged compression/decompression method by a third system service of said sender computer system before transmission, as an integral part of transmitting said data from said sender computer system to said receiver computer system, in response to a data sending request of said sender process to said third system service; and d) decompressing automatically said data in accordance to said logged compression/decompression method by a fourth system service of said receiver computer system after receiving said data from said sender computer system, but before said received data is given to said receiver process, as an integral part of receiving and giving said data to said receiver process, in response to a data reading request of said receiver process.

2. The method as set forth in claim 1, wherein, said step b) comprises logging said determined compression/decompression method in a sender routing table of said sender computer system by said first system service, and in a receiver routing table of said receiver computer system by said second system service.

3. In a network of computer systems comprising a sender computer system having a sender process and a receiver computer system having a receiver process, wherein said sender process provides data to said receiver process, an apparatus for transferring said data from said sender process to said receiver process, said apparatus comprising:

a) first system service means disposed on said sender computer system for sending a sender list of compression/decompression methods understood by said sender computer system to a second system service means while establishing connection from said sender computer system to said receiver computer system on behalf of said sender process, said sender list being in order of sender preference;

said second system service means disposed on said receiver computer system for replying to said first system service with a receiver list of compression/decompression methods understood by said receiver computer system, said receiver list being in order of receiver preference;

said first and second system services further individually deducing a compression/decompression method understood by both said sender and receiver computer systems in accordance to an identical predetermined manner using said sender and receiver lists, based on sender preference dominance, without further communication between said first and said second system services for the purpose of determining said compression/decompression method understood by both;

b) third system service means disposed on said sender computer system for transmitting said data to be transferred from said sender computer system to said receiver computer system in response to a data sending request from said sender process, and as an integral part of said transmission, automatically compressing said data in accordance to said determined compression/decompression method before transmission; and c) fourth system service means disposed on said receiver computer system for receiving said transmitted data, returning said received data to said receiver process in response to a data reading request from said receiver process, and as an integral part of said receiving and returning, decompressing said data in accordance to said determined compression/decompression method after receiving said data, but before returning said received data to said receiver process.

4. The apparatus as set forth in claim 3, wherein, said first and second system services log said determined compression/decompression method in a sender and a receiver routing table disposed on said sender and said receiver computer system respectively.

\* \* \* \* \*

UNITED STATES PATENT AND TRADEMARK OFFICE
CERTIFICATE OF CORRECTION

PATENT NO. : 5,557,749
DATED : September 17, 1996
INVENTOR(S) : David Norris It is certified that error appears in the above-identified patent and that said Letters Patent is hereby corrected as shown below:

In column 1 at line 37 delete "Liembel-Ziv" and insert --Liempel-Ziv--

In column 4 at line 3 delete "Liembel-Ziv" and insert --Liempel-Ziv--

Signed and Sealed this

Twenty-eighth Day of January, 1997

Attest:

BRUCE LEHMAN

*Attesting Officer*     *Commissioner of Patents and Trademarks*